United States Patent [19]

Olsen

[11] 4,314,499
[45] Feb. 9, 1982

[54] MUSICAL INSTRUMENTS FACILITATING TEACHING, COMPOSING AND IMPROVISATION

[76] Inventor: Donald Olsen, 15 Cedar Pl., Sea Cliff, N.Y. 11579

[21] Appl. No.: 74,662

[22] Filed: Sep. 12, 1979

Related U.S. Application Data

[63] Continuation-in-part of Ser. No. 899,086, Apr. 24, 1978, abandoned.

[51] Int. Cl.³ .................. G10D 3/00; G09B 15/02
[52] U.S. Cl. .................. 84/485 R; 84/478; 434/227
[58] Field of Search .............. 84/485, 478, 477 R, 84/470, 471 R, 479 A, 1.03, 115, 267, 1.16, DIG. 30; 35/6, 8 R

[56] References Cited

U.S. PATENT DOCUMENTS

| | | | |
|---|---|---|---|
| 3,415,152 | 12/1968 | Gullickson | 84/478 |
| 3,446,109 | 5/1969 | Scott | 84/478 |
| 3,837,256 | 9/1974 | Gullickson | 84/478 |
| 4,061,072 | 12/1977 | de Castillo | 84/478 |
| 4,080,867 | 3/1978 | Ratanangsu | 84/478 |

*Primary Examiner*—L. T. Hix
*Assistant Examiner*—S. D. Schreyer
*Attorney, Agent, or Firm*—Burton S. Heiko

[57] ABSTRACT

An equal input output learning device that can be added to or built into any musical instrument facilitating the teaching and improvisation of music and muscial theory using the musical instrument itself which device consists of a plurality of 12 switches representing the equal tempered 12 tone Chromatic scale, and which switches can be easily activated and changed by the player, as desired, using switches separately or in any combination, and, which switches when activated show all notes of the pitch classes chosen by indicators on the musical instrument together with indicators on the switches themselves.

5 Claims, 16 Drawing Figures

FIG. 2
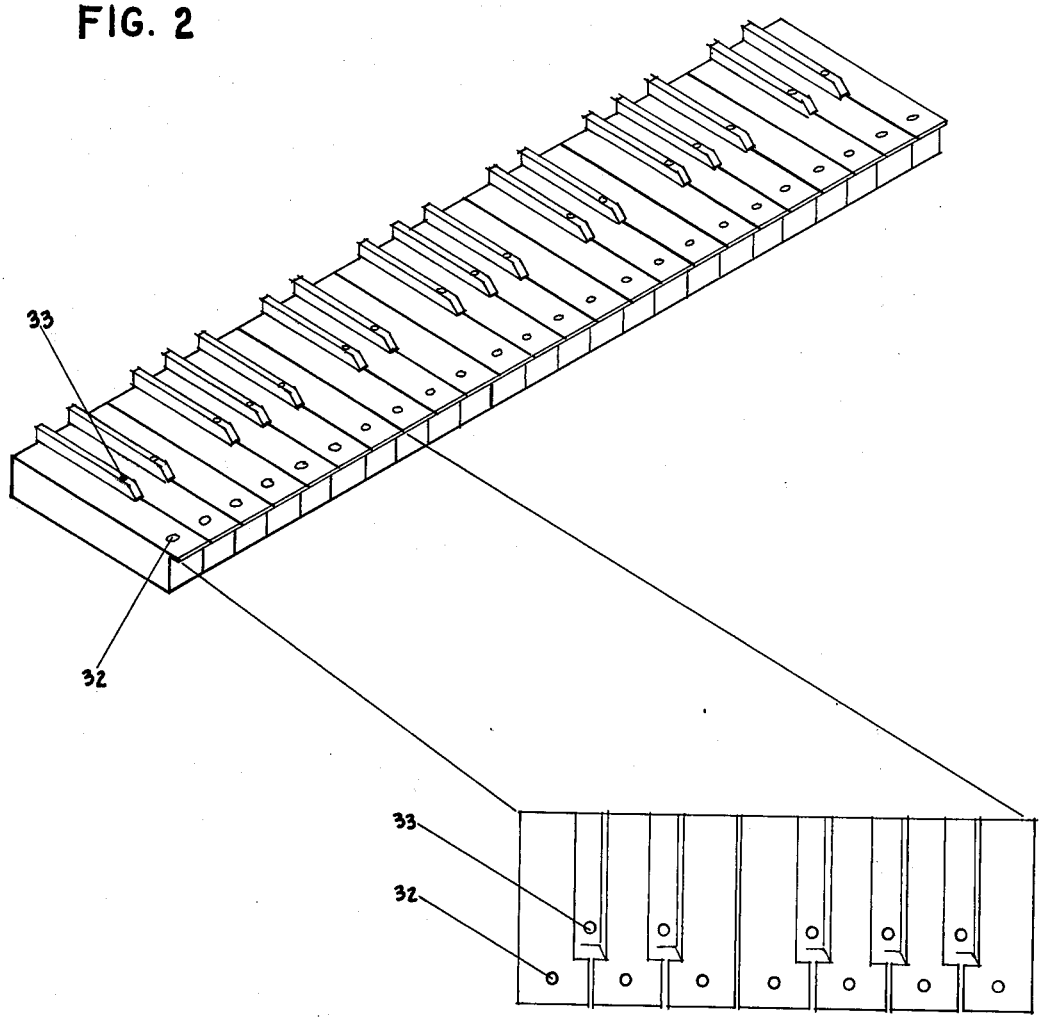
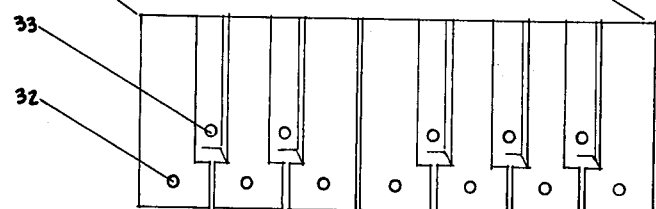
FIG. 3
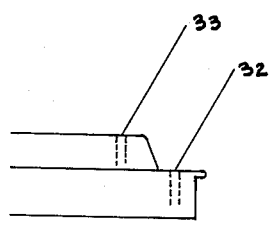
FIG. 4
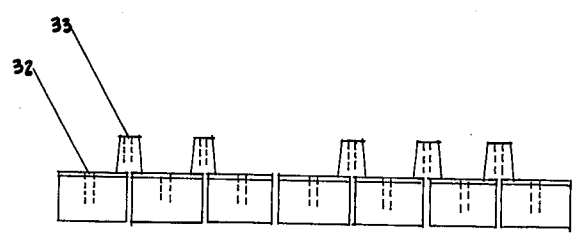
FIG. 5

FIG. 6
FIG. 7
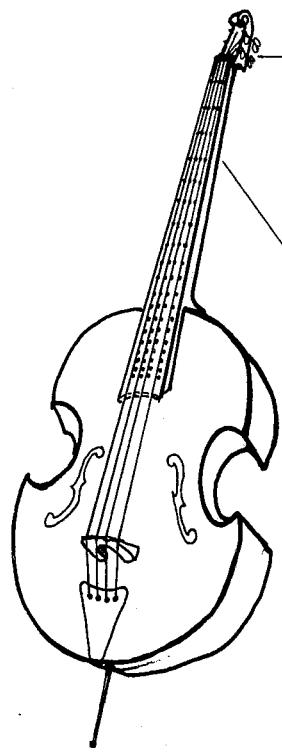
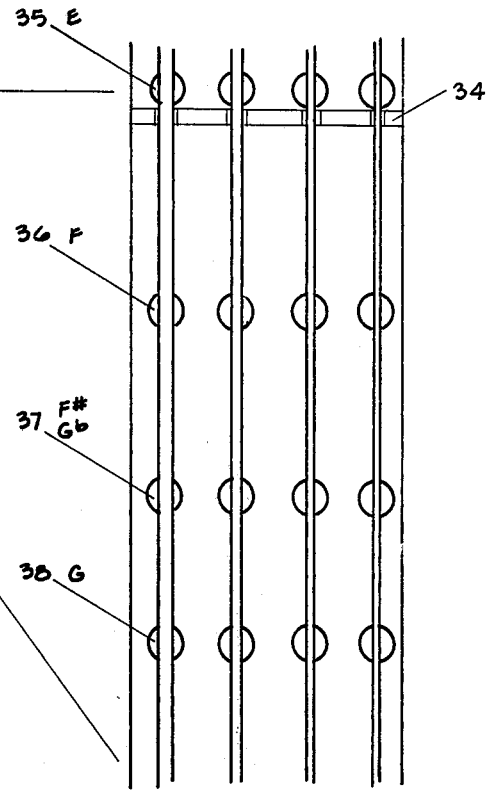
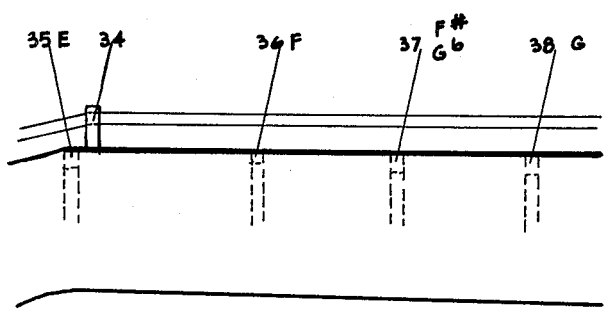
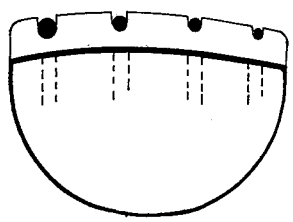
FIG. 8
FIG. 9

MUSICAL INSTRUMENTS FACILITATING TEACHING, COMPOSING AND IMPROVISATION

STATUS WITH PREVIOUS APPLICATION

This application is a continuation-in-part of a previous application made by the same applicant filed Apr. 24, 1978 and given Ser. No. 899,086 abandoned which previous application is presently co-pending with this one.

BACKGROUND OF THE INVENTION

1. Field of the Invention

This invention relates to devices for teaching, composing and improvising music using ordinary musical instruments that use the equal tempered 12 tone chromatic scale. Many types of instruments can be fitted with the invention in question but the more important ones are those that use a keyboard, percussion, strings or frets. Specifically, in its preferred state, the field of the present invention involves an input system consisting of twelve switches, each of which switches represent a pitch class of the equal tempered 12 tone chromatic scale, which switches are so wired that each is independent of the others, with the switches arranged in a circular like pattern showing in graphic form the constant ratio relationship between the pitch classes; and an output system controlled by the switches displaying the pitch classes chosen on the playing surface of the instrument so used by illumination means with the switches themselves also illumined when in an on state, indicating the precise place on the instrument where the pitch classes can be stopped or depressed.

2. Description of the Prior Art

Previous teaching devices were designed to provide various display situations mechanically and in a more pre-programed rather than music like way. In all of these patents one mechanical act initiates a display, only on the surface of the instrument and not showing how it is formed, to be imitated by the player. In U.S. Pat. No. 3,837,256 pre-programed data initiates a display of lights sequentially lit on the instrument together with a sound guide to help the player imitate the piece as it is playing. The player has no control over nor can he change the selection. Another invention issued U.S. Pat. No. 4,061,072 provides for a chord selection device, also imitated by the player, involving 12 pushbuttons which can only be pushed one at a time which cause the chord to be displayed on keyboard instruments in all their octaves by circuitry that includes fiber optics. The player need only press one of the buttons for a major chord to be displayed. And only one change can be made in that chord which is the same for all chords chosen. Still another device, suitable primarily for stringed and fretted instruments, was given U.S. Pat. No. 4,080,867, wherein the display means consist of an x-y grid system of lights, one alongside the neck of the instrument and the other across the frets. This used in conjunction with a programmable digital system provides for a sequential display of single x and single y light combinations, the intersection point of which will provide the location of various notes and their time values, in accordance with the pre-programed piece that has been entered into the memory of the device. A change in a note can only be made by a complicated digital adjustment.

Although all of the aforementioned inventions are, perhaps, successful in accomplishing the goals for which they were designed, none prior provide the built in variability and ease of change inherent in the present invention and which is completely under the control of the player and subject to any changes he wishes to make.

SUMMARY TO THE INVENTION

Briefly in accordance with the present invention, a device that can be added to a musical instrument or built into the instrument itself, consisting firstly, of a plurality of 12 switches each with some on means to show activation, arranged in a circlelike pattern so as to chromatically and mathematically represent the 12 tone equal tempered tuning musical structure in its purest and most graphic form, and upon which any pitch related musical concepts, from the simplest to the most complex can be learned without any limits by any pre-programed or pre-mechanized system; and secondly, appropriate wiring and display means which enable each switch to be independent of the others, and display accurately on the surface of the instrument involved the location of the pitch classes chosen by the circular switching matrix. In this way the input and the output of the invention becomes musically correlated and the learning experience is reinforced by having the musical concepts clearly illustrated both by the input using the switching matrix and the output illuminating the proper places on the instrument where the pitch classes chosen may be stopped or depressed.

It is the object of this invention to provide a device that musically teaches both theory and practice at the same time.

It is another object of this invention to provide a device that is easy to use and that can be easily changed.

BRIEF DESCRIPTION OF THE DRAWINGS

FIG. 2 is an isometric view of a keyboard showing how the indicator lights would be placed thereon.

FIG. 3 is a top view of the keyboard showing one octave of that keyboard.

FIG. 4 is a side view of the keyboard showing how the indicator lights would be placed on the keys themselves.

FIG. 5 is a front view of one octave of the keyboard.

FIG. 6 is a front view of a bass fiddle.

FIG. 7 is a section of the neck of the front view in FIG. 6 illustrating a portion of the fingerboard.

FIG. 8 is a side view of part of the neck as set forth in FIG. 7.

FIG. 9 is a cross section of the neck of the bass fiddle at the nut.

DETAILED DESCRIPTION OF THE PREFERRED EMBODIMENTS

While the invention will be described in connection with preferred embodiments, it will be understood that it is not intended to limit the invention to these embodiments. On the contrary, it is intended to cover all alternatives, modifications and equivalents as may be included within the spirit and scope of the invention as defined by the appended claims.

Figure 1:
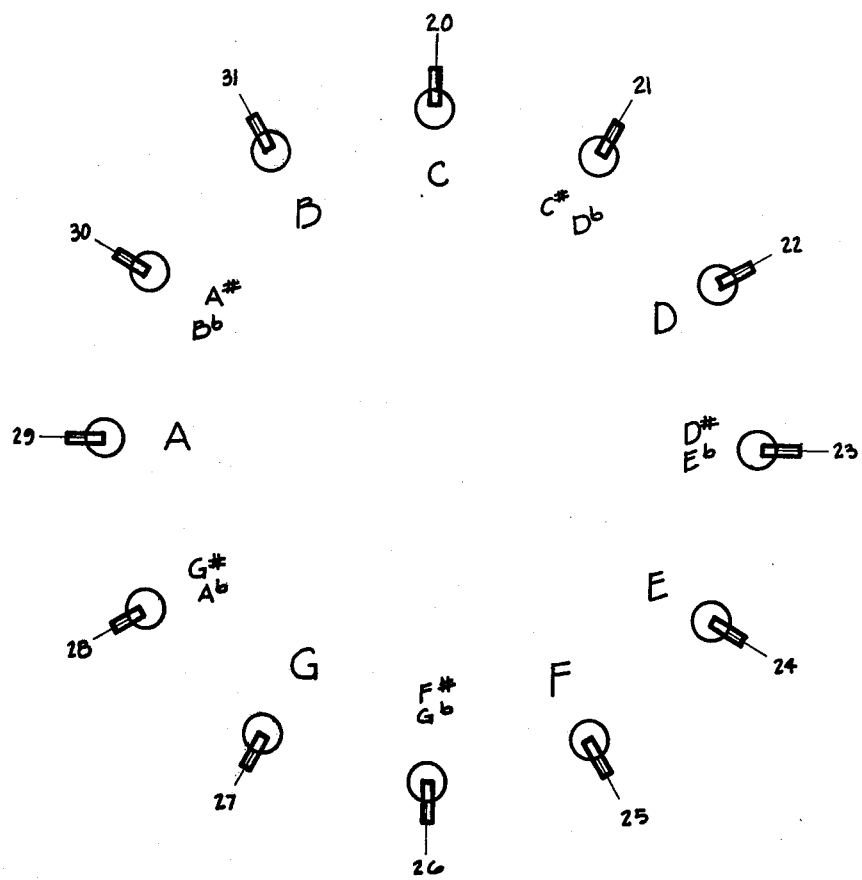
FIG. 1 is a plan view of the preferred circle of switches showing the equal tempered 12 tone chromatic scale and how each switch stands for one of the pitch classes of that scale.
Figure 10:
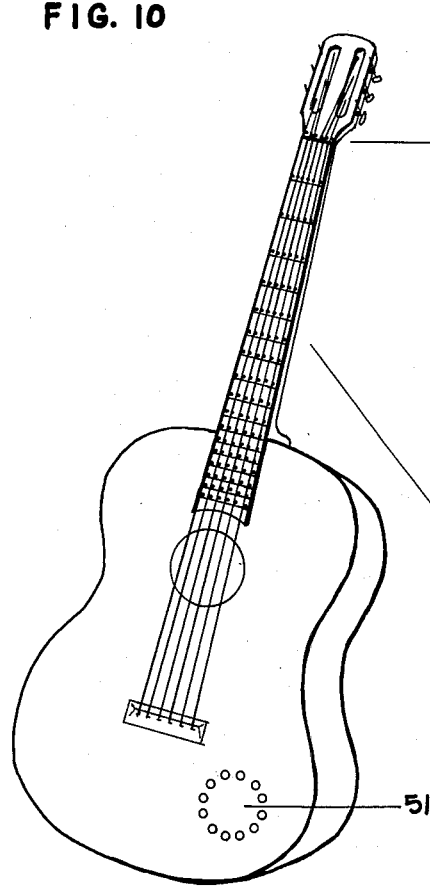
FIG. 10 is a front view of a guitar.

In FIG. 1 which is a plan view of the 12 switches representing the 12 tone equal tempered chromatic scale, numbers 20 through and including 31, each represent a pitch class of that scale. For example, No. 20 represents the pitch class "C" on the chromatic scale. A pitch class consists of all notes of the same letter name for the entire range of the instrument. Therefore, No. 20 will control the illumination means for displaying the location of all of the "C" notes contained in the range of the respective instrument. In addition, besides controlling this illumination means, activation of No. 20 can also cause an indicator light adjacent to itself to light up thus clearly showing that the pitch class "C" has been chosen. The advantages of these switches and adjacent lights being arranged in a circlelike manner are that firstly, the circularlike configuration provides infinite freedom in illustrating the intervallic structure of theoretical concepts such as chords, scales and the like; and secondly, that this arrangement with all switches and their adjacent lights being an equal constant ratio apart, such as the semi-tones that represent the chromatic scale, provides a graphic representation of 12 tone equal tempered tuning. Since chromaticism and 12 tone equal tempered tuning are concepts on which higher levels of musical theory are based, the aforementioned circular switches as a special matrix, used in conjunction with an appropriately located and wired display means, provides a unique and effective approach for the learning and teaching of any pitch related musical concepts from the simplest to the most complex.

Examples of application of this invention to learning of given theoretical concepts will be discussed subsequent to a description of the wiring and placement of the display means in accordance with the preferred embodiments.

Figure 16:
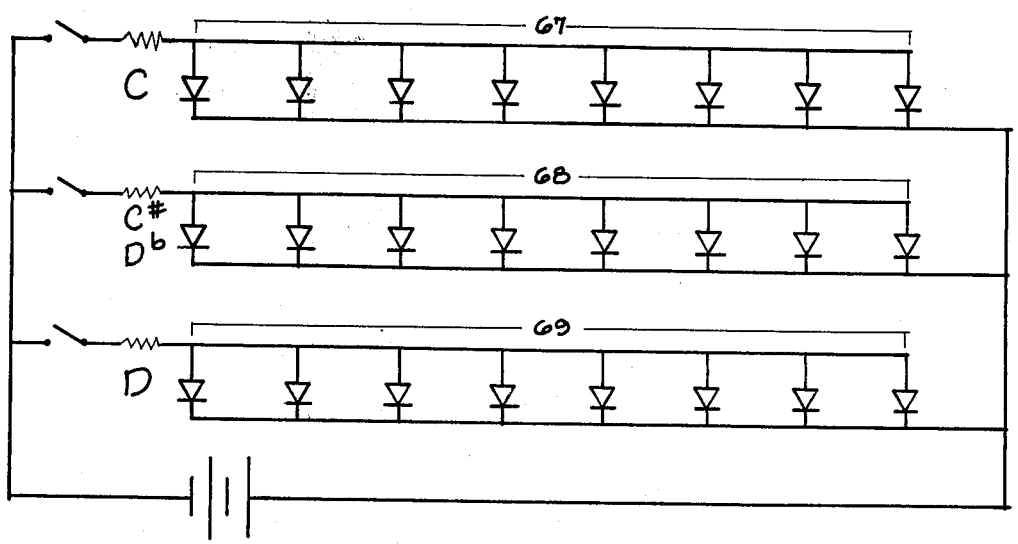
FIG. 16 is part of an electrical diagram illustrating the wiring diagram for three of the twelve channels using Light Emitting Diodes.

FIG. 16 shows a wiring diagram with 3 of the 12 channels drawn showing how the L.E.D.s or L.C.D.s for the display means are wired and connected. Numbers 67, 68 and 69 would be the circuits for indicators "C", "C sharp or D flat", and "D" respectively. Since all channels are wired in a like manner this serves as being representative of the entire circuit. The switches shown in FIG. 16 are the activators of FIG. 1. Therefore, the switches in the channels Numbered 67, 68 and 69 would be the same switches numbered 20, 21 and 22 respectively. As would be obvious to anyone skilled in the art, the activation of any individual switch will cause all of the lights controlled by that switch to light simultaneously. Since all of the switches and the circuits they control operate independently of each other, it is possible and desireable to activate any combination of switches simultaneously in any musical combination and just as easily change any of these at will. It should also be apparent to anyone skilled in the art although the diagram illustrates the lights of each channel being wired in parallel the lights could also be wired in series. In addition a DC power source other than the battery shown in the drawing could be used.

In order to make the system function as intended, it is necessary to have the lights so placed on or near the playing surface as to correspond to the location where all of the notes of a given pitch class occur on the respective instrument.

FIG. 2 is an isometric view of a keyboard showing the placement of indicator lights on such keyboard. FIG. 3 is a top view showing one (1) octave on the keyboard. Numbers 32, and 33, show two tones, No. 32 being the note "C" and No. 33 being the note "C sharp," as examples of notes on the keyboard. FIG. 4 shows the one (1) octave section of the keyboard from the front view.

FIG. 7 shows a section of the neck of the Bass Fiddle illustrating the fingerboard. Number 34 shows the nut while numbers 35, 36, 37 and 38 illustrate where indicators would be placed on the neck representing notes "E", "F", "F sharp or G flat", and "G" respectively. FIG. 7 not only represents a section of the neck but also one of the strings on the neck. If the switches were activated for the previous notes or pitch classes in this preferred embodiment the four L.E.D.s or L.C.D.s represented by Numbers 35, 36, 37 and 38 would light up not to mention other lights on other strings. The same numbers are shown in a side view of the neck set forth in FIG. 8.

Figure 11:
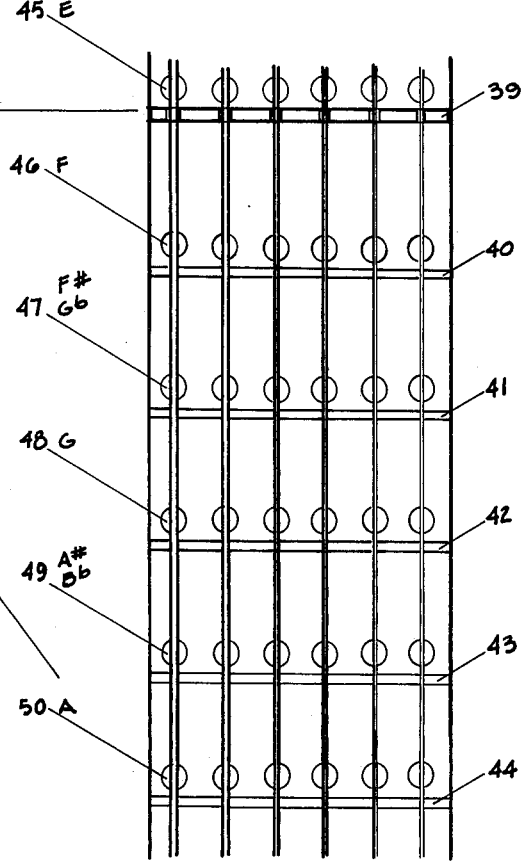
FIG. 11 is a front view of a section of the neck of the guitar showing the fingerboard.
Figure 12:
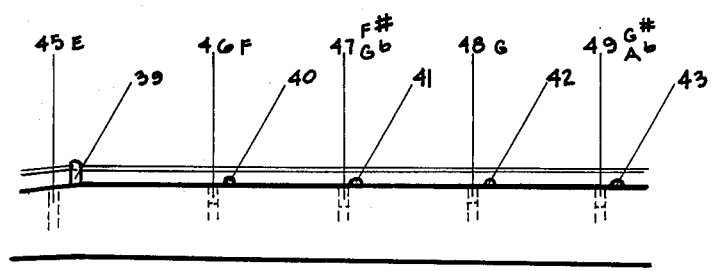
FIG. 12 is a side view of part of the neck in FIG. 11.
Figure 13:
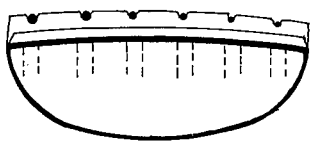
FIG. 13 is a cross section of the neck at the nut.

FIG. eleven (11) shows a portion of the neck of the guitar with only a portion of one string numbered. Number 39 shows the nut while numbers 40, 41, 42, 43 and 44 shows the Frets on that portion of the neck shown in the figure. Numbers 45 to and including 50 show the indicator lights representing pitch classes "E", "F", "F sharp or G flat", "G", "G sharp or A flat", and A respectively. If the switches were thrown on the control dial all of the L.E.D.s or L.C.D.s would light up indicating these pitch classes as part of the scale or chord chosen. FIG. 12 shows a portion of FIG. 11 showing how the indicators would look from the side. FIG. 13 shows a cross section of the neck. Number 51 shows how in the preferred embodiment the dial containing the switches would be placed on the instrument itself. However, not all the instruments need have the switching dials. Instances can occur where dual control of like instruments or even of unlike instruments can be devised with the controls on only one instrument but with all the instruments having like indicators.

Figure 14:
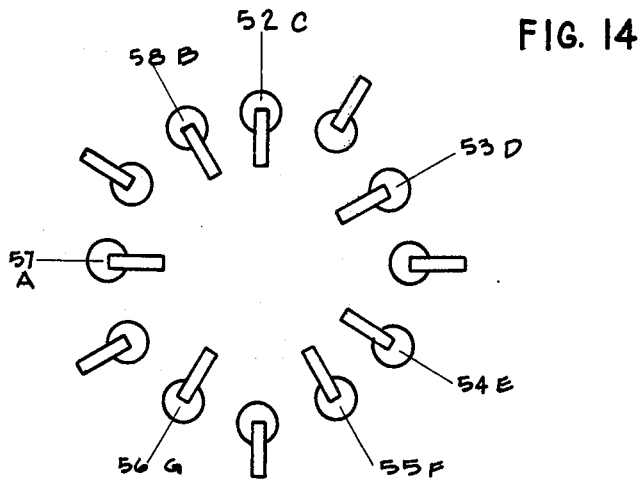
FIG. 14 is an example of the circlelike group of switches, plan view, showing them in position when the C Major scale is chosen.
Figure 15:
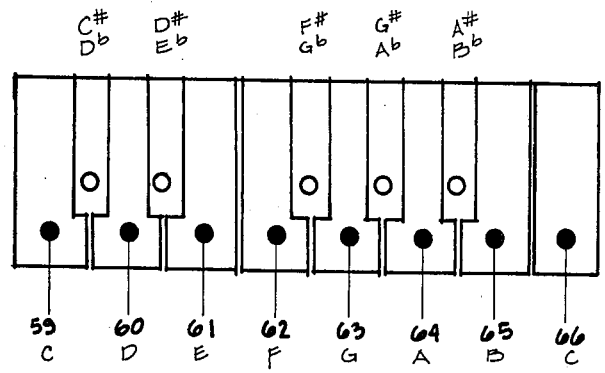
FIG. 15 is a plan view of one octave of a keyboard instrument indicating the C Major Scale pursuant to the switches thrown in FIG. 14.

In FIG. 14 there is shown an arrangement of the circle like matrix containing the switches with the switches thrown to the C Major scale. Numbers 52, 53, 54, 55, 56, 57 and 58 are shown thrown on the matrix or dial in FIG. 14. These numbers represent respectively, the pitch classes, "C", "D", "E", "F", "G", "A" and "B". In FIG. 15, as an example, of how the switches control the indicators the L.E.D.s or L.C.D.s on a keyboard would light up Numbers 59 through and including Number 66. These lights on the keyboard of FIG. 15 would represent the same C Major scale but only now shown on the instrument exemplified by the keyboard.

A simple example of the application of this invention to the learning of pitch related concepts would be the teaching of a major scale and tied in with this, the concept of transposition. The interval pattern of a major scale is tone-tone-semitone-tone-tone-tone-semitone. If this were to be applied to FIG. 1 using the key of "C", represented by Number 20, it would be determined that the interval pattern of the switches chosen to be activated would have to be "C", "D", "E", "F", "G", "A" and "B" which pitch classes would be represented by switches Numbered 20, 22, 24, 25, 27 29 and 31 respectively. After these switches have been activated the user could then play the selected notes as displayed by the indicators, starting on the first note chosen and following the pattern of notes chosen, and upon playing them would produce the characteristic sound of a major scale. The switch matrix would indicate which note to play first. An introduction to the concept of transposition could be effectively made by illustrating to the user that one can start the major scale on any of the twelve pitch classes he chooses as long as it conforms to the interval pattern of the major scale. From this demonstration that one can always produce the major scale sound starting on any note a knowledge of the concept of intervals can be developed and clearly shown and demonstrated, first on the switching circle matrix, and then on the playing surface of the instrument itself. In this way the structure of a chosen interval can be clearly seen and these made into an aurally perceived reality by playing the indicated notes on the instrument itself. Additionally, dials showing the proper intervals for chords and scales could be added to the circle of switches showing how proper intervals can lead to correct musical theory.

Another application of the circle would be in the teaching of the circle of fifths, wherein a user could learn how key signatures are derived. For example, after learning of the structure of a major scale and how the intervals are determined, the player could combine these two elements in the following way. Given the major scale of "C" again, the player could be instructed to count up a perfect fifth which would bring him to the switch numbered 27, the pitch class of "G". Then, applying the previously given interval patterns, he would activate the switches numbered 27, 29, 31, 20, 22, 24 and 26, or notes "G", "A", "B", "C", "D", "E" and "F sharp" respectively. Continuing to apply this principal, that is, counting up a perfect fifth from switch numbered 27, pitch class "G", would bring you to switch numbered 22 or pitch class "D". Applying the interval pattern from that note to make up a scale, and then counting up another perfect fifth and so forth, the user would be able to see the logical progression of key signatures as determined by the circle of fifths. This method would, of course, illustrate all of the sharp keys. To anyone skilled in the art, it would be obvious that counting up a perfect fourth instead of a perfect fifth, and then following the same procedure would produce all of the flat keys.

Once these facts have been clearly understood, chord structure which is devised from and based on scales, can then be explained. For example, a simple major chord triad consists of the first, third and fifth note of any major scale. In the key of "C" this would be represented by the activators numbered 20, 24 and 27. These would be the pitch classes "C", "E" and "G". Since interval patterns, that is to say, the relative space between notes, is what makes things sound as they do regardless of the note on which an interval pattern is started, valuable information about chord structure can be derived from the location of the activated switches on the chromatic sircle of switches. An observation of the spaces between the notes of the major chord would disclose that the interval pattern of any major chord is a major third as in the space between 20 and 24, which is between pitch classes "C" and "E" respectively, followed by a minor third as represented by the space between numbers 24 and 27, which is between "E" and "G". Therefore, the player would realize that as with the major scale he can start on any note he chooses and as long as he selects the pattern of major third followed by a minor third on the circle he will always have a display of a major triad the root of which will correspond to the name of the first switch activated. If the user wished to increase his choice of notes to extend beyond that of a simple traid he or she could easily do so simply by activating another switch. If he wished to display a "C" Major 7 chord, for example, he would simply have to actuate Number 31 which corresponds to the "B" note switch and this would add the seventh degree of the major scale to the chord, making for a richer and more complex sounding chord than any simple triad. Again, the pattern of notes chosen would be clearly displayed on the circle of switches in conjunction with the display of the chosen pitch classes on the playing surface of the instrument where the user can determine what the sound of the selected example is, as well as the fingering for achieving that sound.

There are three other types of triads besides the major triad, namely, a minor triad, a diminished triad and an augmented triad. All of these can be more easily perceived with an explanation of their structure on the circle before being played. For example, a full diminished chord, which because of its lack of a perfect fifth relationship is a more ambiguous chord than a major or a minor chord, oftentimes is a more difficult chord to grasp, but can be easily and effectively demonstrated and explained on the chromatic circle. Since a full diminished chord is a sequence of minor thirds if it were begun on the note "C", number 20, it would include the switches numbered 23, note "E flat", 26, note "G flat", and 29, note "A", which when represented on the circle of switches would resemble the numbers 12, 3, 6 and 9 on the face of an ordinary clock. Thus, the inherent symmetry of the chord becomes immediately obvious to the user, as well as the fact that there are only three (3) diminished chords, which could be started on note "C", number 20, as was just done, or note "C sharp or D flat", number 21 or on "D", number 22. If begun on "E flat", number 23, one would quickly realize that the notes would be identical to a "C" diminished 7th chord, and, therefore, redundant.

Musically higher levels of application of this device can be found in the learning of an application of scales as a basis for soloing and improvising. A scale which is very popular as a basis for improvisation is the Dorian Mode, derived from a major scale, that only uses the second degree of a given major scale as its root while conforming to the interval patterns of the major scale from which it is derived. In the major scale of "C", wherein the notes are "C", "D", "E", "F", "G", "A", "B" and "C", a Dorian scale would begin on the note "D", and all notes played would be identical to the notes given in the key of "C", except that "D" would be the new starting point, or as stated before, the root. This would bring about some alterations in the interval pattern of the resultant scale, which could be clearly seen on the circle of switches. For example, the first and perhaps the most significant change would be between the first and third notes namely, "D", number 22, and "F", number 25. As shown on the circle, this would be a distance of a minor third making this scale the most useful as a soloistic basis over a minor chord. Another deviation from the major scale would be the presence of the minor 7th, namely, the note "C", number 20. Therefore, this scales prevalent use would be as a soloistic basis for a minor 7th chord, the root of which is identical to the root of the scale. In this case, a Dorian scale would be used against a minor 7th chord, namely, as "D" Dorian scale as against a "D" minor 7th chord. The method of use here would be simply for the individual to record a segment of the appropriate chord and, then, upon playback, experiment within the framework of the notes chosen by playing various combinations of the indicated notes on the instrument itself. The application of this sort of approach are limited only by the knowledge and understanding of the player and can, therefore, be as infinitely varied as music itself. An extremely advanced player can still make as much use of this device as an amateur, only instead, dealing with musical problems commensurate with his level of ability. He may, for example, wish to improvise on a scale that contains notes that are alterations of the chord over which he is soloing. This could greatly aid the player in learning to hear new possibilities and come up with new lines. Through all of the aforementioned applications the most important element to keep in mind is that the process of entering information into the device is as much as part of the learning experience as is the playing from the resultant display on the playing surface of the instrument. Since this device is not pre-programed in any way, the user must either have some knowledge of the principles involved, or be learning them in order to effectively use this device. The circle of switches provides a place to think, to teach and to work out musical problems, and, since it is a true representation of musical structure, it is as limitless in use as music itself. In essence, the function of the device is to take an abstract concept, such as a theoretical principle and turn it into a visual concept on the circle or switches and from there make it into an aural experience as realized by the playing of selected lights.

Many additions could be made to the circle of switches such as overlays or collars that could visually show the intervals necessary for scales, chords or other concepts. These could be built into the instrument or added later and even interchangeable ones could be made.

While the invention has been described in conjunction with specific embodiments thereof, it is evident that many alternatives, modifications and varaitions will be apparent to those skilled in the art in light of the foregoing description. Accordingly, it is intended to embrace all such alternatives, modifications and variations as fall within the spirit and broad scope of the appended claims.

I claim:

1. A device for a musical instrument wherein both the device and the musical instrument for which it is designed used as their musical base the chromatic even tempered 12 tone scale, which device is either built into or placed upon the instrument itself, and, wherein the device provides a display means upon the fingerboard of the instrument consisting of lighting, illumination or designation means showing the exact place or places on the instrument where a string or strings are to be stopped, depressed or fingered with the fingers of one hand so that the note or combination of notes so selected as indicated by the display means can be plucked, strummed or played with the fingers of the other hand; and control means providing for user activation of the aforesaid display means; wherein the improvement comprises:

(a) a plurality of lights or other illumination or designation means located on or near the fingerboard of the instrument itself wherein each individual light, illumination or designation means is placed so as to display the exact location on the fingerboard where each and every string or any part of them is to be stopped, depressed or fingered by the fingers of one hand so that a selected note or notes as displayed on the fingerboard can be played by the fingers of the other hand simultaneously plucking, strumming or playing the same string or strings so stopped as indicated; and (b) with a plurality of switches, each switch controlling the illumination or activation of the display means for one pitch class on any part of one or all of the strings on the instrument where the selected notes naturally occur, and, which switch control means controls the illumination or activation of the display means associated with a pitch class separately from and independent of other switches controlling the display means associated with other pitch classes; and (c) with the wiring circuitry arranged so that activation of one switch controlling the illumination of the display means of one pitch class is independent of and separate from any other circuit controlling the illumination or the designation of the display means of any other pitch class and with the stopping point displays of all notes of any given pitch class connected together so that all stopping points of any activated pitch class can be displayed simultaneously on all their locations on or near the fingerboard of the instrument used where the selected note naturally occurs; and, (d) which switches are activated by the player with input chosen by the activation of individual switches or combinations of switches which switches control the illumination or activation of the display means located on or near the fingerboard of the instrument used and from out of the plethora of actuated or illuminated display means indicating a plurality of all notes of a selected pitch class possible to play on any part of the strings of the instrument used, the player can pick and choose from each pitch class involved; and (f) which pattern of selection of pitch classes first chosen by the activation of selected switches can be changed by using the same matrix of switches which original selection and subsequent change conform to musical theory both in input and output and which pitch classes chosen are multiplely displayed by the display means on or near the fingerboard of the instrument used at the precise places to be stopped by one hand in order to sound any notes of the selected pitch class with the other hand.

2. The device for controlling displays on musical instruments in accordance with claim 1 wherein the plurality of switches is in the form of a circularlike pattern, in chromatic order, the distance from one adjacent switch to another around the periphery of the circle of switches corresponding to the concept of equal tempered tuning providing infinite freedom in illustrating, on the switches themselves, intervallic structure and included notes of theoretical concepts such as chords, scales, and the like, and, which switches, when activated, form a visual pattern intervallicly analogous to the visual pattern simultaneously displayed on the fingerboard of the instrument itself.

3. A method for illustrating notes on a musical instrument wherein both the device and the musical instrument for which it is designed use as their musical base the chromatic even tempered 12 tone scale, which device is either built into or placed upon the instrument itself, and, wherein the device provides a display means upon the fingerboard of the instrument consisting of lighting, illumination or designation means showing the exact place or places on the instrument where a string or strings are to be stopped, depressed or fingered with the fingers of one hand so that the note or notes or combinations of notes so selected as indicated by the display means can be plucked, strummed or played with the fingers of the other hand, and control means providing for user activation or deactivation of the aforesaid display means, wherein the improvement comprises:

(a) displaying a plurality of lighting, illuminating or other designation means differentiating both the same and different notes or pitch classes on or near the fingerboard of the instrument used and indicating the exact place on the fingerboard where each and every string or any part of them is to be stopped in order to sound the particular note or notes chosen by the player when played; and (b) controlling the illumination or activation of the display means with a plurality of switches, each switch controlling the display means for one pitch class on any part of one or all of the strings on the instrument and which switch control means controls the display means associated with a particular pitch class separately from and independent of the other switches controlling the display means associated with other pitch classes; and (c) wiring the circuitry used so that activation of one switch controlling the display means of one pitch class uses one circuit which is independent of and separate from any other circuit controlling the display means of any other pitch class and with the stopping point displays of all notes of any given pitch class connected and displayed together so that all stopping points of any activated pitch class can be displayed simultaneously on all their locations on the fingerboard of the instrument used; where the selected notes of the pitch class chosen naturally occur; and (d) activating the switches by the player which switches control the display means located on or near the fingerboard of the instrument used and from which notes activated and displayed the player can choose which notes are to be sounded; and (e) displaying an analogous pattern around the switches similar to that displayed on the fingerboard of the instrument used which display forms a ratioed pattern intervallicly like that displayed on the fingerboard of the instrument itself; and (f) selecting the original activation of switches or any changes therein by using the same matrix of switches which selection conforms to musical theory both in input and output and which pitch classes chosen are multiplely displayed by the display means on the fingerboard of the instrument used at the precise place to be stopped by the fingers of one hand in order to sound any note of the selected pitch class by the fingers of the other hand.

4. The device for controlling displays on musical instruments in accordance with claim 1 wherein the musical instruments applicable are stringed and fretted.

5. A method of controlling musical instruments with displays on their playing surfaces in accordance with claim 3 wherein the musical instruments applicable are stringed and fretted.

* * * * *